July 14, 1959  G. GORHAM  2,894,482
TIME DELAY CONTROL DEVICE FOR TISSUE PROCESSING MACHINES
Filed April 8, 1957  3 Sheets-Sheet 1

INVENTOR.
George Gorham
BY
ATTORNEYS

July 14, 1959           G. GORHAM           2,894,482
TIME DELAY CONTROL DEVICE FOR TISSUE PROCESSING MACHINES
Filed April 8, 1957           3 Sheets-Sheet 2
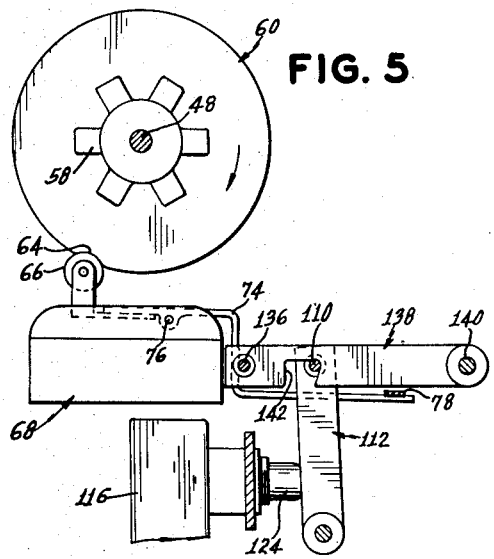
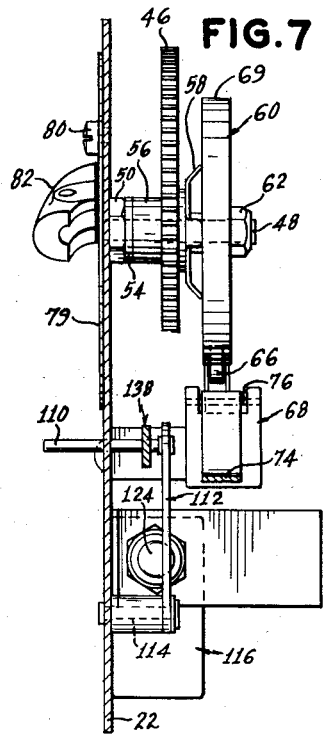
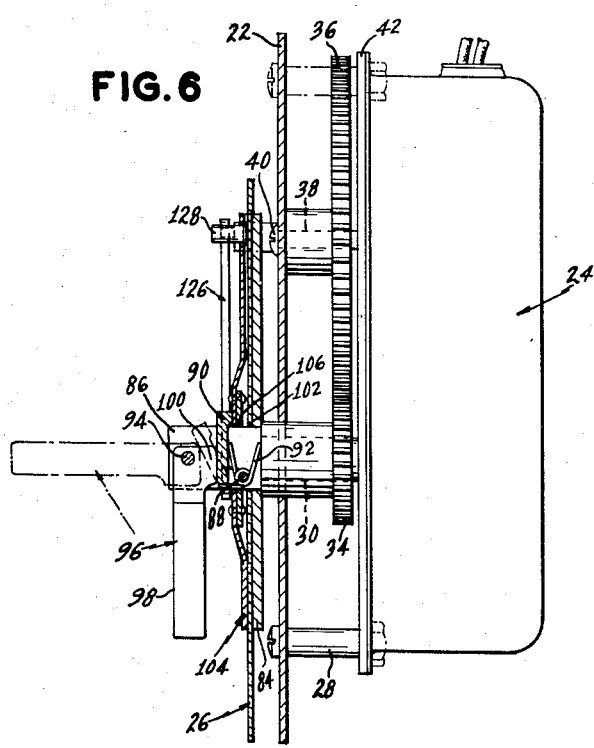
INVENTOR.
George Gorham
BY
ATTORNEYS

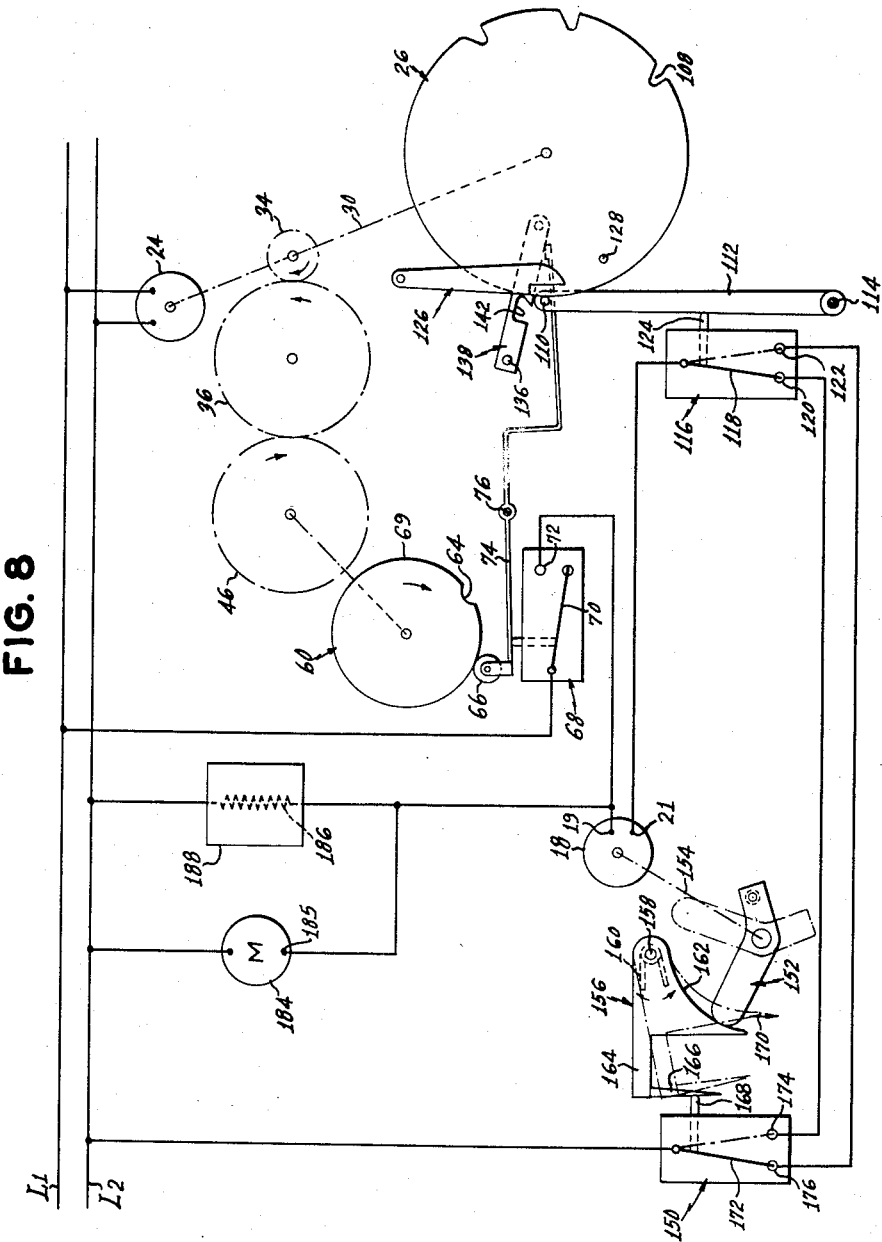

United States Patent Office
2,894,482
Patented July 14, 1959

2,894,482

TIME DELAY CONTROL DEVICE FOR TISSUE PROCESSING MACHINES

George Gorham, New York, N.Y., assignor to Technicon International Ltd., Chauncey, N.Y., a corporation of New York Application April 8, 1957, Serial No. 651,211

23 Claims. (Cl. 118—11)

The present invention relates, in general, to automatic immersion apparatus which is especially suitable for the preparation of histologic tissue for microscopic examination and, in particular, to time delay control mechanism therefor.

In automatic immersion apparatus of the type to which the present invention relates, provision is made for a twenty-four hour clock controlled timing cycle during which various tissue processing operations can be performed automatically to prepare the tissue for microscopic examination. For example, and not by way of limitation, the preparation of the tissue may include the successive immersions thereof in a plurality of liquid agents, for predetermined lengths of time, first to fix the tissue, then to wash the tissue to remove the fixative, then to dehydrate the tissue by successive immersion in a plurality of dehydration agents, then to immerse the tissue in a clearing agent, and finally the infiltration of the tissue with an infiltration agent. The various processing steps continue automatically under the control of the timing mechanism until the processing of the tissue has been completed. However, it frequently is desirable, or it may be necessary, to delay the start of the tissue processing operation, or to introduce a predetermined delay period at some step during the processing operation.

Therefore, it is an object of the present invention to provide a highly accurate and efficient delay device which can be readily set to introduce a delay period prior to the start of the processing cycle or during the processing cycle, as may be required.

Another object of the present invention is the provision of a time controlled delay device in which the necessity for a separate clock mechanism for the time delay control device is obviated. In this connection, a more specific object is to utilize the same clock mechanism which controls the timing of the tissue processing operations for controlling the time delay control device.

A further object is to provide a time delay control device which is so related to the timing mechanism which controls the processing operations that the timing mechanism for said processing operations never has to be reset in order to operate the time delay control device. In this connection, a more specific object is to provide for a control system wherein the twenty-four hour clock which controls the various processing operations operates continuously and is not interrupted by the operation of the time delay control device.

A still further object is to provide a time delay control device of generally simplified and efficient construction which is highly accurate in operation.

The above and other objects, features and advantages of the present invention will be more fully understood from the following description considered in connection with the accompanying illustrative drawings.

In the drawings, which illustrates the best mode presently contemplated of carrying out the invention:

Fig. 5 is a fragmentary view similar to Fig. 4 and illustrates the parts at the termination of the operation of the time delay control mechanism, or when the latter is inoperative;

Fig. 6 is a sectional view, on an enlarged scale, taken on the line 6—6 of Fig. 2;

Fig. 7 is a sectional view, on an enlarged scale, taken on the line 7—7 of Fig. 2; and Fig. 8 is a wiring diagram combined with a more-or-less diagrammatic illustration of various components of the apparatus.

Figure 1:
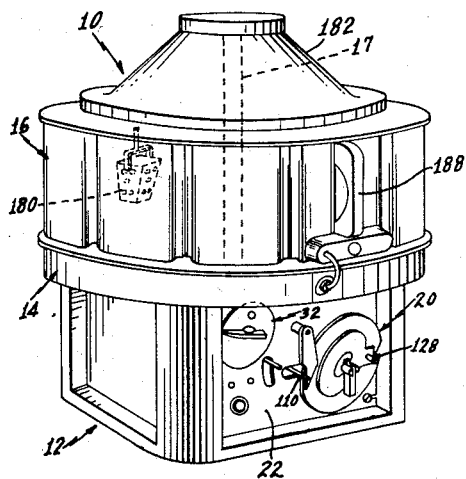
Fig. 1 is a perspective view of an automatic immersion apparatus which is provided with a time delay control device pursuant to the present invention.

Referring now to the drawings in detail, an automatic immersion apparatus, pursuant to the present invention, is indicated generally by the reference numeral 10. Said immersion apparatus is provided with a base or housing 12 which mounts a support 14 for a plurality of circularly related receptacles 16 which contain the various liquids or reagents required for tissue processing operation. It will be understood that the apparatus 10 contains suitable conveyor mechanism, generally indicated by the reference numeral 17, operated under the control of a motor 18 (Fig. 8) for moving cover 182 which mounts a tissue holder 180 so as to move the latter successively into and out of the various liquid receptacles 16 for subjecting the tissue to the processing action of the various liquids contained in said receptables and into a paraffin bath 188. Conveyor mechanism suitable for this purpose is illustrated and described in Patents Nos. 2,583,379 to N. G. Kling and 2,741,221 to E. C. Weiskopf and A. Ferrari, and in the copending application of Jack Isreeli, Serial No. 474,210, filed December 9, 1954, each of which is assigned to the assignee hereof. As illustrated in these patents and in said copending application, the conveyor motor 18 operates under the control of a clock timing mechanism which is generally indicated by the reference numeral 20.

As here shown, the timing mechanism 20 is provided on a panel 22 suitably mounted in the housing 12. The timing mechanism 20, for controlling the various tissue processing operations, is constituted by a conventional electric clock motor 24 and by a twenty-four hour processing or timing disc 26. The clock motor 24 is suitably secured, at the rear of the panel 22, as by the mounting elements 28. The clock motor 24 drives a shaft 30 which projects through the panel 22 to rotate the timing disc 26 which controls the tissue processing operation.

Figure 3:
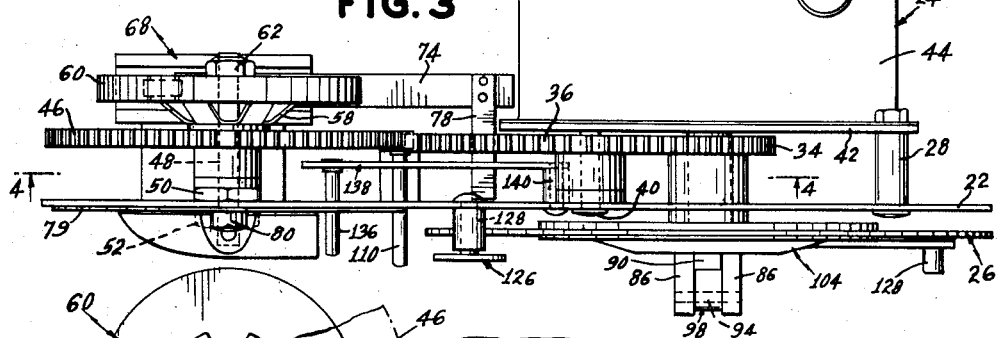
Fig. 3 is a plan view, on an enlarged scale, taken in the direction of the arrow 3 in Fig. 2.
Figure 4:
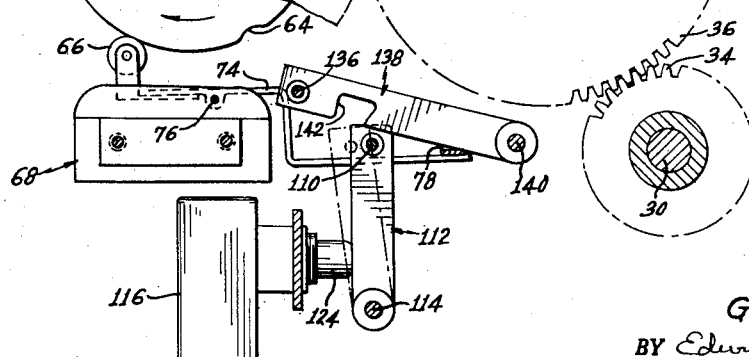
Fig. 4 is a sectional view, taken on the line 4—4 of Fig. 3, with portions broken away for purposes of illustration, and with the various parts illustrated as disposed during the operation of the time delay mechanism.

Pursuant to a highly novel feature of the present invention, the time clock motor 24 is utilized also to operate a time delay control device 32 to delay the start of the processing operation for a predetermined time interval. As best seen in Figs. 3, 4 and 6, the clock driven shaft 30 mounts a drive gear 34. The gear 34 is in mesh with an idler gear 36 which is mounted for rotation on a shaft 38. The shaft 38 is mounted by the panel 22, as at 40, and by a plate 42 to which the casing 44 of the clock motor assembly 24 is secured by the previously mentioned mounting elements 28. The idler gear 36 meshes with a driven gear 46 which has a loose fit on a shaft 48. It will be noted that the gear ratio of the gears 46 and 36, respectively, is one to one and, as here shown, the gear ratio of the gears 36 and 34 is three to one, the reason for which will be hereinafter described in detail.

The shaft 48 extends through the panel 22, being secured therein by the cooperating nuts 50 and 52 at the opposite side of the panel 22, respectively. The shaft 48 is provided with an integral collar or flange 54 which abuts the hub 56 of the gear 46. The shaft 48 also mounts a spring spider 58 and a cam disc 60. The disc 60, which has a relatively tight fit on the shaft 48, is forced against the spring 58 and the latter is forced against the gear 46 to provide a relatively tight frictional engagement therebetween, which is retained by the locking nut 62 provided at the free end of the shaft 48. It will be understood that even though the gear 46 has a loose fit on the shaft 48, the relatively tight frictional fit of the spring spider 58 between the gear 46 and the cam disc 60 is sufficient to effect the rotation of the disc 60 in response to the rotation of the gear 46 by the gear 36, and that the shaft 48 may be freely manually rotated to rotate the disc 60.

The cam disc 60 is provided with a cam depression 64 which is adapted to receive a roller 66 provided on a normally closed master switch 68. It will be understood that said master switch, here shown as a microswitch is open when roller 66 rides on the rim 69 of disc 60 and movable contact 70 (Fig. 8) of the switch engages the associated stationary contact 72 when the roller 66 rides off the disc rim into the cam recess 64. The roller 66 is provided on a lever 74 which is pivotally mounted, as at 76, on the housing of the microswitch 68 and it will be understood that the usual spring bias provided on the movable contact 70 to urge the latter into engagement with the stationary contact 72 is sufficient to bias the roller 66 against the rim of the disc 60 and into engagement in the recess 64. At the end thereof, opposite the roller 66, the lever is provided with a cross piece 78, the function of which will presently appear. As best shown in Fig. 8, the microswitch 68 is connected in series between a power line L1 and the terminal 19 of the conveyor motor 18 so that the circuit to said terminal is open when the roller 66 is engaged on the rim 69 of the disc 60, as illustrated in Figs. 4 and 8, and being closed when the roller is engaged in the recess 64 as in Fig. 5.

The time delay control device 32 also includes a disc 79 which, in the present embodiment, is calibrated in one hour increments to provide a maximum delay of seventy-two hours. The calibrated dial 79 has a loose fit on the shaft 48 and is fixed to the front of the panel 22, as by the securing element 80, which also functions as a detent for a knob indicator 82 secured to the shaft 48 outwardly of the dial 79.

The timing disc 26 for the tissue processing operations is formed of suitable rigid sheet material, preferably metal, and is calibrated to show the twenty-four hours of the day in increments of ten minutes. In order to mount the disc 26 on the clock shaft 30, the latter is provided, outwardly of the panel 22 with an integral collar or flange 84 which provides a back rest for the disc 26. In order to clamp the disc 26 against the back rest, the latter is provided with the integral portions 86, 86 which project forwardly therefrom which mount a pivot element 88 therebetween on which there is pivotally mounted a clamp lever 90. A coiled spring 92 provided on the pivot 88 biases the clamp lever 90 from the full to the broken line position thereof illustrated in Fig. 6. The companion parts 86, 86 also mount a second pivot pin 94 adjacent the free ends thereof, on which there is mounted a cam lever 96 having a finger piece 98 and a cam head 100.

In order to mount the twenty-four hour process timing disc 26 for rotation by the time clock mechanism 24, the lever 96 is moved from the full to the broken line position thereof illustrated in Fig. 6, and the locking element 90 is moved to the broken line position thereof by the spring 92. The timing disc 26, which is provided with a central aperture 102, is then slipped over the extended lever 96, the latter extending through the aperture 102 and is moved into abutment with the back rest 84. The second disc 104, the function of which will presently appear, is also provided with a central aperture 106 which is slipped over the extended lever 96 to overlie the timing disc 26. The lever is then moved from the broken line to the full line position thereof, whereby the cam head 100 moves the clamp element 90, against the bias of the spring 92, into clamping engagement with overlying disc 104 to releasably lock the discs 26 and 104 in position for rotation by the shaft 30.

Figure 2:
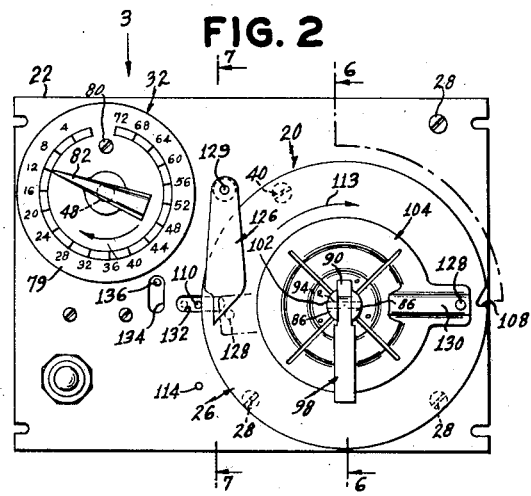
Fig. 2 is an enlarged view, in elevation, of the control panel of the automatic immersion apparatus.

The timing disc 26 is provided with notches or indentations 108 in the periphery thereof to provide a predetermined timed sequence of operation of the motor 18 for raising and lowering the associated conveyor mechanism whereby to predetermine the time or period of immersion of the tissue in the liquids in the various receptacles 16, as described in detail in the previously identified patents and in the copending application. A timing pin 110 which normally engages the periphery of the disc 26 is moved in and out of the various indentations 108, during the rotation of the disc 26 in the clockwise direction indicated by the arrow 113 in Fig. 2, to control the operations of the motor 18. The timing pin 110 is carried at the free end of a lever 112 which is pivoted, as at 114. The lever 112 cooperates with a microswitch 116 which is suitably mounted at the inner surface of the panel 22. The microswitch 116 has a movable contact 118 and a pair of stationary contacts 120 and 122. It will be understood that the movable contact 118 is biased to normally engage the stationary contact 122. A switch operating element, which operates the movable contact 118, is indicated at 124, and is biased into engagement with the lever 112 by the bias of the movable contact element 118. The timing pin 110 projects through the panel aperture 132 and when said timing pin rides on the periphery of the timing disc 26, as illustrated in Figs. 2 and 8, the lever 112 is pivoted about its pivot 114 to urge the switch operating element 124 inwardly of the microswitch 116 for moving the movable contact 118 into engagement with the stationary contact 120, and when the timing pin 110 is opposite a recess 108 of the disc 26, the bias on the movable contact 118 operates through the switch operating element 124 to pivot the lever 112 to engage the timing pin 110 in the adjacent recess 108, the switch contact 118 moving into engagement with the stationary contact 122 by the bias thereon.

Provision is also made to discontinue the operation of the motor 18 after the processing operation has been completed. In this connection, there is provided a cut-off lever 126 which is pivotally mounted at the front of the panel 22 as at 129. The cut-off lever 126 is operated by a cut-off pin 128 provided on the laterally extending arm 130 of the previously mentioned disc 104 which overlies the timing disc 126 and which rotates with the latter. It will be understood that the cut-off lever is pivotally moved by the pin 128 to engage and operate the timing pin 110 to discontinue the processing operation, as hereinafter described.

The panel is also provided with a vertically extending aperture 134 through which there projects a pin 136 which is provided on one end of a lever 138. The lever is pivotally mounted, as at 140, on the inner surface of the panel 22. The lever is provided with a recess or cut-out 142, in which the pin 110 of lever 112 is positioned (Fig. 5) at the end of the operation of the machine, under the control of time disc 26, and is thus prevented from moving into a notch 108. Pin 136 enables lever 138 to be moved manually to release pin 110.

Referring now to Fig. 8 in detail, there is illustrated a wiring diagram of the present invention, including a diagrammatic illustration of certain of the components thereof. In addition to the previously mentioned microswitches 68 and 116, the system for controlling the operations of the motor 18, includes an additional microswitch 150 which, with the microswitch 116, constitutes a two-switch three-wire control system similar to that described in the aforementioned copending application and in the aforementioned Patent No. 2,157,875. In this system, the condition of the switch 116 is dependent upon whether the pin 110 rides on the periphery of the timing disc 26 or whether it falls into a timing notch 108 or whether it is operated by the cut-off pin 128 which is carried by arm 130 of disc 104 and actuates the cut-off lever 126. On the other hand, the condition of the microswitch 150 depends upon the operation of the conveyor mechanism by the motor 18. For example, as fully illustrated and described in the previously identified copending application, and as illustrated herein in Fig. 8, provision is made for a driving or cam member 152 which is mounted for rotation by suitable mechanism driven by the motor 18, as diagrammatically indicated by the linkage 154. The driving member 152 cooperates with a contact actuator 156 which is suitably pivotally mounted in the apparatus, as at 158. The contact actuator is biased by the spring 160 so that it tends to rotate counter-clockwise. The contact actuator is provided with a cam portion or face 162 and with an arm 164 which extends outwardly and away from the cam portion and which arm has a depending part 166 which is adapted to actuate the contact operating element 168 of the microswitch 150. It will be understood that the driven member 152 rotates in a counter-clockwise direction, as indicated by the arrow 170.

It will be understood, that as the member 152 rotates in its counter-clockwise direction, it is operable to first pivot the actuator 156 in a clockwise direction to engage the switch operating element 168 so that the movable switch member 172 is moved from the broken line position thereof, in engagement with stationary contacts 174, to the full line position thereof in engagement with stationary contact 176, and that continued travel of the member 152 along the cam face 162 permits the actuator 156 to return to the position thereof illustrated in Fig. 8, under the control of the spring 160, and the biased movable contact 172 returns to the broken line position thereof.

The function of the delay mechanism 32 is to delay the start of the processing operation for a predetermined interval, for example, and not by way of limitation, to provide a delayed start over the week-end. In this connection, the apparatus will be set up for operation for example with the various parts as indicated in Fig. 8. In the present instance, as previously indicated, the delay device 32 provides for a starting time delay up to seventy-two hours in one hour increments. Since the timing mechanism for the processing operation operates on the basis of a twenty-four hour time cycle, having the previously mentioned timing disc 26 which is calibrated for a twenty-four period and operated by a conventional clock motor 24, it will be apparent that for a maximum delay of seventy-two hours, the timing disc 26 will make three rotations for a single rotation of the delay disc 60. Consequently, and to provide for this relationship, there is a three-to-one ratio between the idler gear 36 and the drive gear 34 and a one-to-one ratio between the idler gear 36 and the driven gear 46, to provide a three-to-one ratio between the driven gear 46 and the drive gear 34. It will be understood that for a delay mechanism 32 having a longer or shorter maximum delay period, the gear ratio will be changed accordingly. To set the delay mechanism, it is necessary only to operate or rotate the knob 82 to the desired delay interval, as indicated on the calibrated delay dial 79. For example, and as indicated in Fig. 2, there is indicated a delay time of twelve hours and for such a delay setting, the delay disc 60 is positioned as illustrated in Figs. 4 and 8 by the operation of the shaft 48 by the finger piece 82. As previously indicated, due to the loose fit of the gear 46 on the shaft 48, the latter may be rotated relative to the gear by turning the finger piece 82. It will be noted that during any delay interval, before the delay period has terminated, the cam recess 64 in the delay disc 60 is out of engagement with the roller 66 of the microswitch 68. In such relative position of the roller 66 engaged on the rim of the disc 60, the lever 74 is cammed to the position thereof illustrated in Fig. 4 in which it will be noted that the cross piece 78 has pivoted the locking lever 138 upwardly from the position thereof illustrated in Fig. 5, which latter figure shows the position of the delay disc 60 in which there is no delay setting to delay the operation of the apparatus. It will be noted that in said retracted position of the locking lever 138, the latter is spaced upwardly from the timing pin 110. It will be understood that the purpose of holding lever 138 in retracted position by lever 74 in the time-delay condition illustrated in Fig. 4, is to prevent lever 138 from moving downwardly when cut-off lever 126 is operated by cut-off pin 128, as a result of the rotation of timing disc 26, to move pin 110 to the left. It will be noted also that when pin 110 is at the right in operative relation to disc 26, lever 138 is prevented by said pin from moving downwardly. Referring now to Fig. 8, it will be noted that with the roller 66 on the rim 69 of the delay disc 60 and not engaged in the recess 64 thereof, the circuit between the motor terminal 19 and the power line L1 is interrupted at the switch 68. It will also be noted that with the timing pin 110 engaged on the rim of the timing disc 26, which is in continuous operation due to the fact that the clock motor 24 is connected across the power lines L1 and L2, the circuit from the other terminal 21 of the motor 18 to the power line L2 is interrupted, in the condition of the parts illustrated in Fig. 8, at the microswitch 150. However, it will be apparent that even if the microswitch 150 was engaged at the contact 174 thereof, the motor 18 would still be de-energized because of the open condition of the microswitch 68. Thereafter, should the timing pin 110 drop into any of the notches 108, during the rotation of the timing disc 26, the switch 116 will operate from the full line to the broken line position thereof illustrated in Fig. 8, but the motor 18 would still remain de-energized due to its open circuit at the switch 68. Moreover, should the cut-off pin 128 engage the cut-off lever 126, during the duration of the time delay interval, the biased arm or lever 112 will merely move from the full line to the broken line position thereof shown in Fig. 4, being free to do so due to the clearance between the locking lever or device 138 and the pin 110, the locking lever being retained in its retracted position due to the engagement of the roller 66 of switch 68 on the rim 69 of the delay disc. Therefore, it will be apparent that the movement of the timing pin into and out of notches 108 during the duration of the time interval will have no effect whatsoever upon the motor 18 and, similarly, the operation of the pin 110 by the cut-off pin 128 through the cut-off lever 126 will also have no effect upon the operation of the de-energized motor 18, said operation of the cut-off lever 126 merely resulting in overtravel of the operating element 124 of the microswitch 116, the latter remaining closed at its contact 120.

However, at the termination of the timing interval, the roller 66 engages in the cam recess 64 with the result that the lever 74 is pivoted to the position thereof illustrated in Fig. 5, and the lever 138 drops down onto the timing pin 110 so that thereafter, if the timing pin 110 is operated under the control of the cut-off pin 128 and the cut-off lever 126, the timing pin will be moved into registry with the recess 142 in the lever 138 to be retained in said position, as illustrated in Fig. 5, in which position the microswitch 116 is closed at its contact 120 to cut-off the operation of the motor 18, as hereinafter described in detail. This prevents operation of the apparatus, under control of timing disc 26, until lever 138 is moved upwardly manually to release pin 110 from the recess of said lever. It will be observed that when lever 74 is moved to the position illustrated in Fig. 5, lever 138 is nevertheless held in raised position by pin 110 as illustrated in Fig. 8 until said pin is moved to the left by lever 126 actuated by cut-off pin 128.

Once the time delay period has run its course and the roller 66 is engaged in the cam recess 64, it will be apparent that the movable contact 70 closes under the normal bias applied thereto to engage the stationary contact 72 so as to complete the circuit between the motor 18 and the power line L1. With the pin 110 engaged on the rim of the timing disc 26, the circuit operates in the same manner as described in the previously identified patents and copending application. In this connection, it will be noted that the operation of the automatic immersion apparatus 10 for moving the tissue holders 180 from one receptacle to another is initiated when the pin 110 drops into a notch 108 of the timing disc 26, it being apparent from Fig. 8 that with the pin 110 on the rim of the timing disc 26, the circuit from the operating motor 18 to the power line L2 is open at the microswitch 150, which is in its full line position, closed at the contact 176. However, when the pin 110 drops into a timing disc notch 108, the switch 116 is closed at its contact 122 to complete the energization of the motor 18 through the microswitch 150 closed at contact 176. The motor 18 being energized, the conveyor mechanism 17 raises the cover 182, to which the tissue holders 180 are secured, as described in the previously identified copending application, to remove the holders from the receptacles in which they were inserted, then to partially rotate the cover 182 to carry the baskets over the next receptacle, and finally to permit the cover 182 to move downwardly to its retracted position, as illustrated in Fig. 1, in which the baskets are immersed in the various receptacles. It will be understood, that a suitable dwell period is provided for the tissue holders over the receptacles from which they were removed prior to the insertion thereof into the liquid of the next receptacles, as illustrated and described in the previously identified copending application. When the tissue holders are again immersed in the liquid of the receptacles, the conveyor mechanism is vertically reciprocated, to vertically reciprocate the covering 182 for vertically reciprocating the tissue in the liquid. In this connection, provision is made for the motor 184 to effect said reciprocation of the tissue holders. It will be noted from Fig. 8 that the energizing circuit for the motor 184 between the terminal 185 of the latter and the power line L1 includes the master switch 68, and it will be apparent that during the delay interval, the motor 184 is de-energized, the latter becoming energized only at the termination of the delay interval.

As previously indicated, the motor control system herein, for the motor 18, is a two-switch three-wire control system similar to that used in the previously mentioned Weiskopf Patent No. 2,157,875 and in the copending application. In such a control system, each time a reversal of condition of either switch 150 or switch 116 occurs, a reversal of the condition of the controlled mechanism occurs. For instance, as shown in Fig. 8, and assuming now that the time delay switch 68 is closed and the holders 180 are within the receptacles 16, if motor 18 is de-energized, the operation of either switch 150 or 116 energizes the motor. As previously indicated, when the pin 110 drops into a notch 108 of the timing disc 26, the condition of switch 116 is reversed so as to energize motor 18 which remains energized until the driving member 152 operates to permit the switch 150 to reverse its condition and thereby de-energize the motor 18. During said energization of the motor, holder 180 is raised out of the receptacle in which it was positioned and then moved into the next receptacle. However, it will be understood that at said de-energization of the motor 18 the pin 110 is still in a notch 108 of the timing disc. Since the timing disc is continuously rotated by the time clock 24, the pin 110 is then moved out of a notch 108 and back onto a rim of the disc 26 so that the condition of the switch 116 is again reversed thus re-energizing the motor 18. The re-energization of the motor 18, now causes the cam member 152 to move along the cam face 162 and due to the contour of the face of the actuator 156, the latter rotates counter-clockwise to operate the switch 150 for a second time and therefore de-energizes the motor 18 again. This second energizing-de-energizing cycle of the motor 18, known as a reload cycle, is a very short duration and moves the conveyor mechanism and consequently the cover 182 an imperceptible amount or not at all so that the tissue holder remains within the receptacle. However, the reload cycle must condition the apparatus for the next transfer of the material holder from one receptacle to another so that when the pin 110 drops into the next notch 108, the motor 18 will once again become energized to repeat the above-described sequences of operation, as fully described in the copending application.

The processing operation is completed or terminated when the cut-off pin 128 engages the cut-off lever 126 to move the movable contact 118 to the full line position thereof and closed at the contact 120 and locks the switch 116 closed in said position by engagement of the pin 110 in the recess 142 of the locking lever 138, as illustrated in Fig. 5.

As previously indicated, the roller 66 of the switch 68 is engaged in the cam recess 64 of the control disc 60 at the termination of the time-delay interval, said disc being mounted on the shaft 48 which is driven through a yieldable driving connection constituted by the spring spider 58 interengaged between the driven gear 46, which is loose on said shaft, and said control disc. At the termination of the time-delay interval, the knob 82 abuts the detent 80 so as to prevent any further rotation of the shaft 48 through said yieldable driving connection. This results in the termination of the rotation of the control disc 60, with the roller 66 remaining in engagement in the recess 64.

It will be noted that the heating element 186 for the paraffin bath 188 is connected in the circuit in the same manner as the motor 184 for reciprocating the tissue baskets, and therefore, it will be apparent that the heater 186 remains de-energized during the delay interval and is energized upon the closing of the switch 68 at the termination of the delay interval.

While I have shown and described the preferred embodiments of my invention, it will be understood that various changes may be made in the idea or principles of the invention within the scope of the appended claims.

Having thus described my invention, what I claim and desire to secure by Letters Patent, is:

1. In apparatus of the character described having means for moving a material holder into and out of each of a plurality of receptacles, electrical means for actuating said moving means, timing means including a clock motor for controlling the normal operations of said electrical actuating means to provide predetermined periods during which the material holder is positioned within the receptacles, respectively, and adjustable delay means operable to render said timing means ineffective for a predetermined period of time to control the operations of said electrical actuating means, said delay means comprising a master control switch for said electrical actuating means which is closed during the normal operations of said timing means, and which is open during said predetermined period of time and means driven by said clock motor at a speed different from that of the latter for closing said master switch upon the expiration of said predetermined period of time.

2. In apparatus of the character described having means for moving a material holder into and out of each of a plurality of receptacles, an electric motor for actuating said moving means, timing means including a timing motor, a rotary timing disc operated by said timing motor for rotation about an axis and switch mechanisms operable under the control of said disc for controlling the energization of said first mentioned motor at predetermined times with intervening times of de-energization, and delay means including a rotary member operated by said timing motor for rotation about an axis which is different from said timing disc axis and master switch means operable under the control of said last mentioned member for preventing the energization of said electric motor under the control of said switch mechanisms for a predetermined time-delay interval and for placing said motor under the control of said timing means upon the expiration of said time-delay interval.

3. In apparatus of the character described having means for moving a material holder into and out of each of a plurality of receptacles, an electric motor for actuating said moving means, timing means including a timing motor, a rotary timing disc operated by said timing motor and switch mechanisms operable under the control of said disc for controlling the energization of said first mentioned motor, and delay means including a second rotary timing disc operated by said timing motor and master switch means operable under the control of said second disc for preventing the energization of said electric motor under the control of said switch mechanisms for a predetermined time-delay interval, said first timing disc having circumferentially spaced notches in its peripheral edge portion, one of said switch mechanisms including a movable arm having a part engageable with said first disc at its peripheral edge and in said notches, said arm being biased for movement to engage said part thereof with said first disc in said notches, respectively, for operating said one of said switch mechanisms, means rotatable with said first disc for moving said part of the arm to a retracted position out of engagement in the notches of said first disc whereby to operate said one switch mechanism to de-energize said electric motor, a locking device for releasably retaining said arm in said retracted position thereof, and means operable under the control of said second disc for releasably retaining said locking device in an inoperative disposition thereof during said predetermined time-delay interval.

4. In apparatus of the character described having means for moving a material holder into and out of each of a plurality of receptacles, an electric motor for actuating said moving means, timing means including a timing motor, a rotary timing disc operated by said timing motor and switch mechanisms operable under the control of said disc for controlling the energization of said first mentioned motor, and delay means including a rotary timing disc operated by said timing motor and switch means operable under the control of said last mentioned disc for preventing the energization of said electric motor under the control of said switch mechanisms for a predetermined time-delay interval, said first mentioned timing disc having circumferentially spaced notches in its peripheral edge portion, one of said switch mechanisms including a movable arm having a part engageable with said disc at its peripheral edge and in said notches, said arm being biased for movement to engage said part thereof with said disc, means rotatable with said first mentioned disc for moving said part of the arm to retracted position out of engagement with said disc, to operate said one switch mechanism to de-energize said electric motor, and a locking device for releasably retaining said part of the arm in said retracted position thereof, and means operable under the control of said delay means for releasably retaining said locking device in an inoperative disposition thereof during said predetermined time-delay interval.

5. In apparatus of the character described having means for moving a material holder into and out of each of a plurality of receptacles, an electric motor for actuating said moving means, timing means including a timing motor, a rotary timing disc operated by said timing motor and switch mechanisms operable under the control of said disc for controlling the energization of said first mentioned motor, and delay means including a rotary timing disc operated by said timing motor and switch means operable under the control of said last mentioned disc for preventing the energization of said electric motor under the control of said switch mechanisms for a predetermined time-delay interval, said first mentioned timing disc having circumferentially spaced notches in its peripheral edge portion, one of said switch mechanisms including a movable arm having a part engageable with said disc at its peripheral edge and in said notches, said arm being biased for movement to engage said part thereof with said disc, means rotatable with said first mentioned disc for moving said part of the arm to retracted position out of engagement with said disc, to operate said one switch mechanism to de-energize said electric motor, and a locking device for releasably retaining said part of the arm in said retracted position thereof, said second timing disc having a notch in its peripheral edge portion, said master switch means including a movable member having a part engageable with said second timing disc at its peripheral edge and in said notch, said member being biased for movement to engage said part thereof with said second disc, and said member being operable to retain said locking device in said inoperative disposition thereof while said part thereof is engaged on the peripheral edge of said second timing disc and to release said locking device upon engagement of said part thereof in said notch of said second timing disc.

6. In apparatus of the character described having conveyor means for moving a material holder into and out of each of a plurality of receptacles, an electric motor for actuating said conveyor means, a timing motor, first timing mechanism operable by said timing motor for controlling the energization of said first mentioned motor for actuating said conveyor means, and second timing mechanism operable by said timing motor to delay the institution of said control by said first timing mechanism for a predetermined interval, said first timing mechanism having a predetermined operating time-cycle and said second timing mechanism being adjustable within a time range of from less than said operating time-cycle to more than said operating time-cycle of said first timing mechanism.

7. In apparatus of the character described having conveyor means for moving a material holder into and out of each of a plurality of receptacles, an electric motor for actuating said conveyor means, a continuously operable timing motor, first timing mechanism operable by said timing motor for controlling the energization of said first mentioned motor for actuating said conveyor means, and second timing mechanism operable by said timing motor to delay the institution of said control by said first timing mechanism for a predetermined interval, said first timing mechanism having a predetermined operating time-cycle and said second timing mechanism being adjustable within a time range of from less than said operating time-cycle to more than said operating time-cycle of said first timing mechanism.

8. In apparatus of the character described having conveyor means for moving a material holder into and out of each of a plurality of receptacles, an electric motor for actuating said conveyor means, a continuously operable timing motor, first timing mechanism operable by said timing motor for controlling the energization of said first mentioned motor for actuating said conveyor means, and second timing mechanism operable by said timing motor to delay the institution of said control by said first timing mechanism for a predetermined interval, said first timing mechanism including means normally operable to terminate the operation of said apparatus and mechanism to releasably lock said terminating means in operation-terminating condition thereof, and said second timing mechanism including means to prevent the operation of said locking mechanism to said operation-terminating condition during said predetermined delay interval, said first timing mechanism having a predetermined operating time-cycle and said second timing mechanism being adjustable within a time range of from less than said operating time-cycle to more than said operating time-cycle of said first timing mechanism.

9. In apparatus of the character described having conveyor means for moving a material holder into and out of each of a plurality of receptacles, an electric motor for actuating said conveyor means, a continuously operable timing motor, first timing mechanism operable by said timing motor for controlling the energization of said first mentioned motor for actuating said conveyor means, and second timing mechanism operable by said timing motor to delay the institution of said control by said first timing mechanism for a predetermined interval, said second timing mechanism including a rotary timing disc operated by said timing motor and switch means operable under the control of said disc for preventing for said predetermined time interval the energization of said electric motor under the control of said first timing mechanism, said first timing mechanism having a predetermined operating time-cycle and said second timing mechanism being adjustable within a time range of from less than said operating time-cycle to more than said operating time-cycle of said first timing mechanism.

10. In apparatus of the character described having conveyor means for moving a material holder into and out of each of a plurality of receptacles, an electric motor for actuating said conveyor means, a continuously operable timing motor, first timing mechanism operable by said timing motor for controlling the energization of said first mentioned motor for actuating said conveyor means, and second timing mechanism operable by said timing motor to delay the institution of said control by said first timing mechanism for a predetermined interval, said second timing mechanism including a rotary timing disc operated by said timing motor and switch means operable under the control of said disc for preventing for said predetermined time interval the energization of said electric motor under the control of said first timing mechanism, and said first timing mechanism including a rotary timing disc operated by said timing motor and switch mechanisms operable under the control of said last mentioned disc for controlling the energization of said electric motor.

11. In apparatus of the character described having conveyor means for moving a material holder into and out of each of a plurality of receptacles, an electric motor for actuating said conveyor means, a timing motor, first timing mechanism operable by said timing motor for controlling the energization of said first mentioned motor for actuating said conveyor means, and second timing mechanism operable by said timing motor to delay the institution of said control by said first timing mechanism for a predetermined interval, said first timing mechanism having a predetermined operating time cycle and said second timing mechanism being adjustable to provide a delay for a predetermined interval ranging from a time period of from less than said operating time cycle to more than said operating time cycle of said first timing mechanism, said apparatus including a motor for reciprocating said material holder when disposed within a receptacle, and means to retain said reciprocating motor in deenergized condition during said predetermined delay interval.

12. In apparatus of the character described having conveyor means for moving a material holder into and out of each of a plurality of receptacles, an electric motor for actuating said conveyor means, a timing motor, first timing mechanism operable by said timing motor for controlling the energization of said first mentioned motor for actuating said conveyor means, and second timing mechanism operable by said timing motor to delay the institution of said control by said first timing mechanism for a predetermined interval, said apparatus including a receptacle provided with a heater, and means controlled by said second timing mechanism to retain said heater in de-energized condition during said predetermined delay interval.

13. A time control device for apparatus having mechanism operable by an electric motor under the control of a plurality of switches, for controlling the connection of said motor to a source of electric current for energizing said motor, comprising a rotary shaft, a timing motor, means operable under the control of said timing motor for rotating said shaft, a control member having a yieldable driving connection with said shaft for rotation thereby, means operable by said control member in a predetermined position of the latter for closing one of said switches for placing said motor under the control of others of said switches for controlling the operation of said motor for actuating said apparatus under the control of said timing motor, and means for adjusting said control member in displaced relation to said predetermined position for predetermining the period of operation of said control member for movement of the latter by said rotary shaft to said position in which it is operable to close said one of the switches, said yieldable driving connection providing means for enabling said shaft to continue to rotate while said control member remains stationary in said predetermined position thereof.

14. A time control device for apparatus having mechanism operable by an electric motor under the control of a plurality of switches, for controlling the connection of said motor to a source of electric current for energizing said motor, comprising a rotary shaft, a timing motor, means operable under the control of said timing motor for rotating said shaft, a control member having a yieldable driving connection with said shaft for rotation thereby, means operable by said control member in a predetermined position of the latter for closing one of said switches for placing said motor under the control of others of said switches for controlling the operation of said motor for actuating said apparatus under the control of said timing motor, and means for adjusting said control member is displaced relation to said predetermined position for predetermining the period of operation of said control member for movement of the latter to said position in which it is operable to close said one of the switches, said yieldable driving connection providing means for enabling said shaft to continue to rotate while said control member remains stationary in said predetermined position thereof, said control member having a working circumference and a part positioned circumferentially thereof for actuating said one of the switches to close the latter when said control member is rotated to said predetermined position.

15. A time control device for apparatus having mechanism operable by an electric motor under the control of a plurality of switches, for controlling the connection of said motor to a source of electric current for energizing said motor, comprising a rotary shaft, a timing motor, means operable under the control of said timing motor for rotating said shaft, a control member having a yieldable driving connection with said shaft for operation thereby, means operable by said control member in a predetermined position of the latter for closing one of said switches for placing said motor under the control of others of said switches for controlling the operation of said motor for actuating said apparatus under the control of said timing motor, means for adjusting said control member in displaced relation to said predetermined position for predetermining the period of operation of said control member for movement of the latter to said position in which it is operable to close said one of the switches, said yieldable driving connection providing means for enabling said shaft to continue to rotate while said control member remains stationary in said predetermined position thereof and means including said other switches operable under the control of said timing motor for controlling repeated intermittent operations of said first mentioned motor at predetermined times following the closing of said one switch.

16. A time control device for apparatus having mechanism operable by an electric motor under the control of a plurality of switches, for controlling the connection of said motor to a source of electric current for energizing said motor, comprising a rotary shaft, a timing motor, means operable under the control of said timing motor for rotating said shaft, a control member having a yieldable driving connection with said shaft for operation thereby, means operable by said control member in a predetermined position of the latter for closing one of said switches for placing said motor under the control of others of said switches for controlling the operation of said motor for actuating said apparatus under the control of said timing motor, and means for adjusting said control member in displaced relation to said predetermined position for predetermining the period of operation of said control member for movement of the latter to said position in which it is operable to close said one of the switches, said yieldable driving connection providing means for enabling said shaft to continue to rotate while said control member remains stationary in said predetermined position thereof, means including said other switches operable under the control of said timing motor for controlling repeated intermittent operations of said first mentioned motor at predetermined times following the closing of said one switch, and means operable after a predetermined member of operations of said first motor following the closing of said one switch for releasably preventing further operation of said first motor.

17. A control device, comprising a rotary member, an electric control switch, means operable in a predetermined position of said rotary member for actuating said switch, time controlled means having a yieldable driving connection with said rotary member for rotating the latter for operating said switch actuating means, means for manually moving said rotary member for adjusting the latter in displaced relation to said predetermined position whereby said rotary member is operable to actuate said switch only after a predetermined time of operation of said time controlled means, and a plurality of circuit controlling switches operable under the control of said time controlled means only when said rotary member is in said predetermined position, said yieldable driving connection providing means for enabling said time controlled means to continue to rotate while said rotary member remains stationary in said predetermined position thereof.

18. A control device, comprising a rotary member, an electric control switch, means operable in a predetermined position of said rotary member for actuating said switch, time controlled means having a yieldable driving connection with said rotary member for rotating the latter for operating said switch actuating means, means for manually moving said rotary member for adjusting the latter in displaced relation to said predetermined position whereby said rotary member is operable to actuate said switch only after a predetermined time of operation of said time controlled means, and a plurality of circuit controlling switches operable in response to the operation of said switch actuating means only when said rotary member is in said predetermined position, said time controlled means having provision for preventing the operation of said plurality of switches after a predetermined operation of said time controlled means following the movement of said rotary member to said predetermined position and means operable to releasably hold said rotary member stationary, in countervailing relation to said yieldable driving connection, following movement of said rotary member to said predetermined position.

19. A control device, comprising a timer, switches operable under the control of said timer, actuating means operable under the control of said switches, a rotary control member having a recess therein in a position circumferentially thereof, a controlled switch member having a part yieldably engageable with said control member in said recess in a predetermined position of said control member, said switch being operable to prevent said switches from controlling said actuating means, means including a yieldable driving connection with said control member for rotating the latter, said control member being manually movable for adjusting the position of said controlled member in relation to said recess, and means operable to releasably hold said rotary member stationary, in countervailing relation to said yieldable driving connection, following movement of said rotary member to said predetermined position, said first mentioned switches being operable to control said actuating means when said rotary member is in said predetermined position.

20. In apparatus of the character described having means for moving a material holder into and out of each of a plurality of receptacles, an electric motor for actuating said moving means, timing means including a timing motor, a rotary timing disc operated by said timing motor and switch mechanisms operable under the control of said disc for controlling the energization of said first mentioned motor at predetermined times with intervening times of de-energization, and delay means including a rotary member operated by said timing motor for rotation about an axis which is different from the axis of rotation of said rotary timing disc, and master switch means operable under the control of said last mentioned member for preventing the energization of said electric motor under the control of said switch mechanisms for a predetermined time-delay interval and for placing said motor under the control of said timing means upon the expiration of said time-delay interval, and means operable independently of said master switch for preventing energization of said motor after a predetermined number of energizations thereof.

21. In apparatus of the character described having means for moving a material holder into and out of each of a plurality of receptacles, an electric motor for actuating said moving means, timing means including a timing motor, a rotary timing disc operated by said timing motor and switch mechanisms operable under the control of said disc for controlling the energization of said first mentioned motor at predetermined times with intervening times of de-energization, and delay means including a rotary member operated by said timing motor for rotation about an axis which is different from the axis of rotation of said rotary timing disc, and master switch means operable under the control of said last mentioned member for preventing the energization of said electric motor under the control of said switch mechanisms for a predetermined time-delay interval and for placing said motor under the control of said timing means upon the expiration of said time-delay interval, and means operable by said timing means and independently of said master switch for preventing operation of said moving means after a predetermined number of operations thereof under the control of said switch mechanisms.

22. In apparatus of the character described having means for moving a material holder into and out of each of a plurality of receptacles, an electric motor for actuating said moving means, timing means including a timing motor, a rotary timing disc operated by said timing motor and switch mechanisms operable under the control of said disc for controlling the energization of said first mentioned motor at predetermined times with intervening times of de-energization, and delay means including a rotary member operated by said timing motor, and master switch means operable under the control of said last mentioned member for preventing the energization of said electric motor under the control of said switch mechanisms for a predetermined time-delay interval and for placing said motor under the control of said timing means upon the expiration of said time-delay interval, and means operable independently of said master switch for preventing energization of said motor after a predetermined number of energizations thereof, said delay means having a time-delay range which is greater than the total time range of operation of said timing means to control the operations of said switch mechanisms.

23. In apparatus of the character described having means for moving a material holder into and out of each of a plurality of receptacles, an electric motor for actuating said moving means, timing means including a timing motor, a rotary timing disc operated by said timing motor and switch mechanisms operable under the control of said disc for controlling the energization of said first mentioned motor at predetermined times with intervening times of de-energization, and delay means including a rotary member operated by said timing motor, and master switch means operable under the control of said last mentioned member for preventing the energization of said electric motor under the control of said switch mechanisms for a predetermined time-delay interval and for placing said motor under control of said timing means upon the expiration of said time-delay interval, and means operable by said timing means and independently of said master switch for preventing operation of said moving means after a predetermined number of operations thereof under the control of said switch mechanisms, said delay means having a time-delay range which is greater than the total time range of operation of said timing means to control the operations of said switch mechanisms.

References Cited in the file of this patent
UNITED STATES PATENTS

| | | |
|---|---|---|
| 1,393,505 | Coates | Oct. 11, 1921 |
| 2,157,875 | Weiskopf | May 9, 1939 |
| 2,324,122 | Weiskopf | July 13, 1943 |
| 2,550,102 | Weiskopf | Apr. 24, 1951 |
| 2,596,330 | Everard | Nov. 13, 1952 |
| 2,619,169 | Anderson | Nov. 25, 1952 |
| 2,733,764 | Bliss | Feb. 7, 1956 |
| 2,788,068 | Blumenfeld | Apr. 9, 1957 |